US009426041B2

(12) United States Patent
Zourzouvillys (10) Patent No.: US 9,426,041 B2
(45) Date of Patent: Aug. 23, 2016

(54) COMMUNICATION SYSTEM AND METHOD (75) Inventor: Theo Zourzouvillys, Bucks (GB)

(73) Assignee: Skype, Dublin (IE)

(*) Notice: Subject to any disclaimer, the term of this patent is extended or adjusted under 35 U.S.C. 154(b) by 339 days.

(21) Appl. No.: 13/102,471

(22) Filed: May 6, 2011

(65) Prior Publication Data

US 2012/0281560 A1    Nov. 8, 2012

(51) Int. Cl.
*H04L 12/28* (2006.01)
*H04L 12/24* (2006.01)
*H04L 12/725* (2013.01)

(52) U.S. Cl.
CPC .......... *H04L 41/5038* (2013.01); *H04L 45/306* (2013.01)

(58) Field of Classification Search
CPC ......... H04L 47/10; H04L 47/35; H04L 47/30; H04L 47/32; H04L 43/50; H04L 43/00; H04L 1/00; H04L 43/10; H04J 3/14; H04B 10/0771; H04Q 7/34
USPC ........ 370/400, 235, 236.1, 236.2, 238, 241.1, 370/242, 248, 252, 389, 351, 384, 395.41
See application file for complete search history.

(56) References Cited

U.S. PATENT DOCUMENTS

| 5,838,663 | A  | * | 11/1998 | Elwalid et al. | ............... | 370/233 |
| 7,342,923 | B2 | * | 3/2008  | Botvich        | ............... | 370/389 |
| 7,652,990 | B2 | * | 1/2010  | Bryson         | ............... | 370/230 |
| 8,346,781 | B1 | * | 1/2013  | Cornelius      | ............... | 707/748 |
| 8,374,102 | B2 | * | 2/2013  | Luft           | ............... | H04L 41/5067 370/253 |
| 2002/0150041 | A1 |   | 10/2002 | Reinshmidt et al. | | |
| 2005/0198200 | A1 | * | 9/2005 | Subramanian et al. | ....... | 709/218 |
| 2010/0260191 | A1 | * | 10/2010 | Hiie | ..................... | H04L 12/1827 370/400 |

FOREIGN PATENT DOCUMENTS

| CN | 101188509 A | 5/2008 |
| JP | 2003244235 | 8/2003 |
| JP | 2004080483 | 3/2004 |
| JP | 2007060189 | 3/2007 |
| JP | 2007520763 | 7/2007 |

OTHER PUBLICATIONS

"International Search Report and Written Opinion", Application No. PCT/EP2012/058192, (Jun. 25, 2012), 12 pages.
"First Office Action Issued in China Patent Application No. 201280021988.9", Mailed Date: Sep. 16, 2015, 14 Pages.
(Continued)

*Primary Examiner* — Brenda H Pham
(74) *Attorney, Agent, or Firm* — Tom Wong; Micky Minhas (57) ABSTRACT

A method of determining information on network resources in a packet-based internetwork comprising multiple routing nodes, the method comprising: distributing user software to each of multiple end-user terminals connected to the internetwork, the user software having a primary user function other than the collection of network data; in association with the user software, distributing secondary code configured to participate in the collection of data by probing different routes from the respective end-user terminal to a destination terminal over the internetwork, each route passing via a plurality of said routing nodes; receiving data resulting from the probing performed by the secondary code on the multiple end-user terminals, including data resulting from routes involving the routing nodes of different network service providers; and determining estimates of network resources based on the received data.

20 Claims, 5 Drawing Sheets

(56) References Cited

OTHER PUBLICATIONS

"Office Action Issued in European Patent Application No. 12719682. 2" Mailed Date: Aug. 17, 2015, 5 pages.
Foreign Office Action, JP Application No. 2014-509683, Feb. 29, 2016, 5 pages.
Foreign Office Action, EP Application No. 12719682.2, Mar. 29, 2016, 6 pages.
Okayama, "A Backbone Selection Method Based on Bandwidth for Multihomed Networks", Oct. 18, 2002, 6 pages.
Suzuki, "Development of End-to-End Qos Management System for VoIP Networks", Technical report of IEICE. TM 105(527), 61-66 The Institute of Electronics, Information and Communication Engineers, Jan. 12, 2006, 7 pages.
Yamamoto, "Special Feature on API—For Perfect Handling of API, the Double-Edged Sword—Welcome to API World!", Visual Basic Magazine, vol. 6, No. 3, Shoeisha Co., Ltd., Japan, Mar. 1, 2000, 16 pages.
Foreign Office Action, CN Application No. 201280021988.9, Jun. 1, 2016, 16 pages.

\* cited by examiner

COMMUNICATION SYSTEM AND METHOD

FIELD OF THE INVENTION

The present invention relates to mapping of network resources over a packet-based internetwork, such as the Internet.

BACKGROUND

Figure 1:
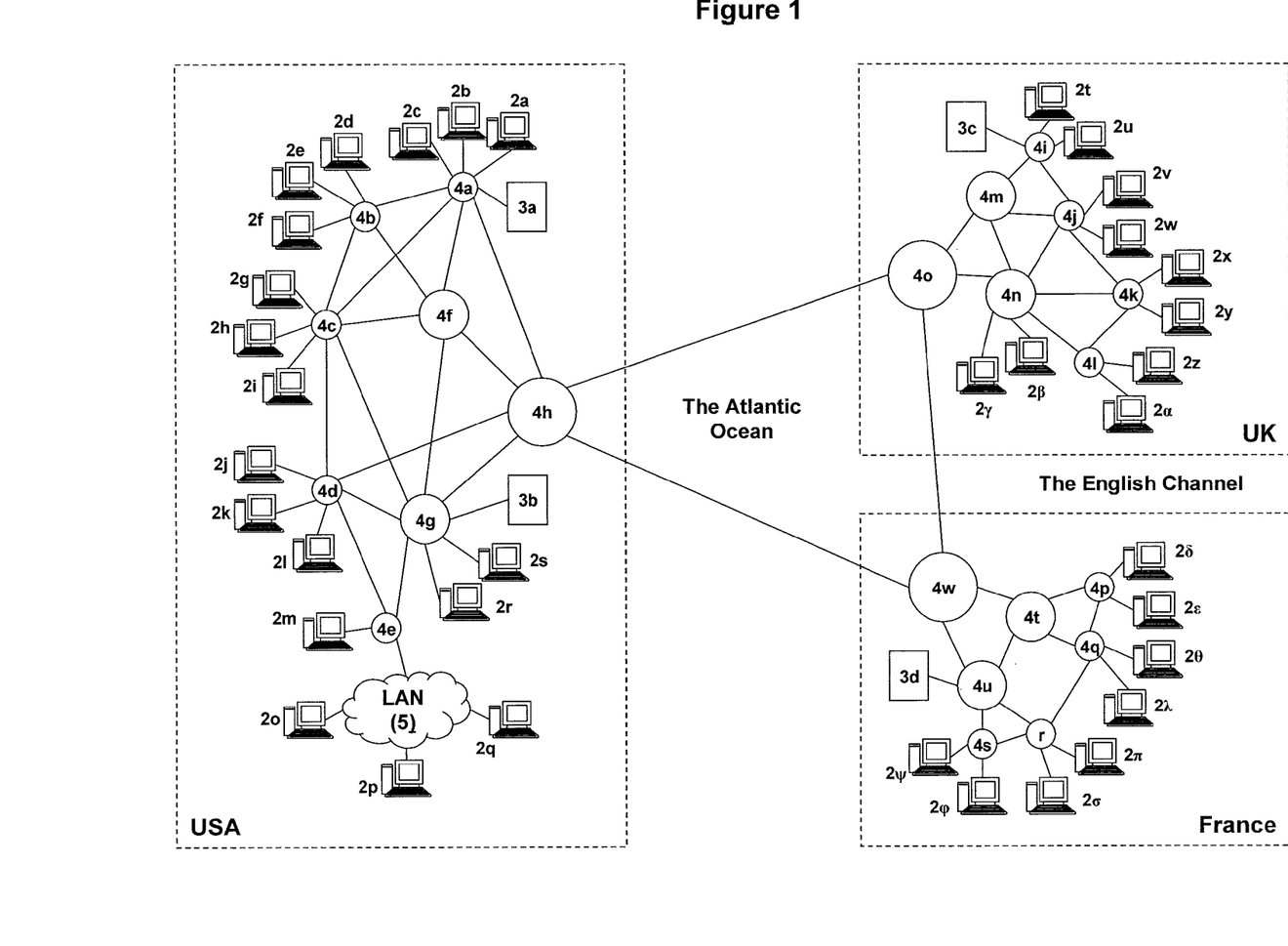
FIG. 1 is a schematised representation of an internetwork such as the Internet.

FIG. 1 gives a highly schematised representation of an internetwork (or portion of an internetwork) such as the Internet. An internetwork is an arrangement in which the networks of two or more different operators are interconnected and arranged to communicate according to a common internetworking protocol or protocols. An internetwork typically connects multiple cities or countries, and is to a certain extent generally unhierarchical in nature. The Internet is by far the most widespread and commonly used example of an internetwork, defined by the use of Internet Protocol (IP) or the Internet Protocol Suite.

As shown in FIG. 1, each of a multitude of end-user terminals 2a, 2b, 2ψ . . . such as desktop computers, laptops, tablets or mobile handsets is connected to at least one routing node 4a, 4b . . . 4w of at least one network service provider. Similarly each of multiple servers 3a . . . 3d is connected to at least one of the routing nodes 4. Each connection may comprise one or more wired and/or wireless stages, e.g. involving a wired modem connection to a telephone landline, a wired local area network (LAN) 5, and/or a wireless connection via a wireless router, or a wireless connection via a packet-based service of a mobile cellular network. Only one local area network (LAN) 5 is shown in FIG. 1 for illustrative purposes, but it will be appreciated that generally many more of the connections between user terminal 2 and its immediate upstream node 4 may be by a LAN. Further, in the case of connection by a wireless router, this may effective form a connection via a small wireless local area network (WLAN), not shown explicitly in FIG. 1.

Each of the routing nodes 4 is directly connected to at least one other adjacent routing node 4, such that each of the service provider nodes 4 are all at least vicariously interconnected to one another. Directly connected here means requiring one only routing hop at the internetwork level, whereas vicariously connected means two or more routing hops.

In operation, an end-user terminal 2 generates packets of data destined for another of the user terminals 2 or servers 3, or vice versa, with the destination being identified by means of an internetwork network address such as the IP address included in a header portion of each packet. The end-user terminal 2 then transmits the packets upstream to a routing node 4 of its local network service provider to which it is directly connected. Each routing node 4 is configured to examine the internetwork address (e.g. IP address) of an incoming packet received from a user terminal 2, server 3 or routing node 4; and based on that address to forward the packet onwards to a next routing node 4 or to the destination user terminal 2 or server 3, as appropriate depending on the current routing node's location within the internetwork relative to the destination. Hence the packet is routed via multiple routing nodes 4 from the source user terminal 2 or server 3 to the destination user terminal 2 or server 3.

Some of the routing nodes such as those labelled 4a-4em, 4i-4l and 4p-4s may handle local traffic (e.g. within a particular city), being directly connected by local links to one or more other local routing nodes (e.g. in the same city). Some of the routing nodes such as those labelled 4f, 4g, 4m, 4n, 4t and 4u may handle intranational traffic (e.g. between cities or states), being directly connected by intranational links to one or more other intranational routing nodes (e.g. in other cities or states). Some routing nodes such as those labelled 4h, 4o and 4w may handle international traffic, being directly connected by one or more international links (e.g. overseas) to other international routing nodes in other countries. Furthermore, each local routing node may also connect directly onwards to one or more intranational or international nodes, and/or each intranational node may connect between one or more local routing nodes and one or more international routing nodes. It will be appreciated however that the connections shown in FIG. 1 are only for illustrative purposes, and that in general a much more complex arrangement is likely to be in place. In practice an internetwork such as the Internet is likely to comprise many more user terminals 2, servers 3 and routing nodes 4 at various levels of geographical interconnection than shown in the schematic illustration of FIG. 1, and the routing nodes 4 are not necessarily divided into strict levels of local, international and international nodes (e.g. an international routing node could also connect directly to end-user terminals or one or more servers 3, etc.).

As mentioned, the routing nodes 4 include nodes operated by a plurality of different operators in the form of network service providers (not all of whom are necessarily direct providers to end-users), and the different network service providers have mutual routing agreements with one another. E.g. two network service providers operating within the same city or state, or two network service providers operating in different countries, may have a mutual agreement to route each other's customers' traffic therebetween.

However, there is a problem with such arrangements in that it is difficult to collect information on network resources. Over time, any particular routing node or nodes 4 may experience varying amounts of traffic. Further, different routing nodes 4 may experience different amounts of traffic at different times, and/or different routing nodes may have different capacity for routing different quantities of traffic per unit time (e.g. different queue lengths or processing power). These or other variations in network resources can result in different negative properties such as packet-loss, latency (delay), or decreased bitrate being experienced at a destination terminal or terminals 2 or 3, e.g. due to routing bottlenecks at certain routing nodes or nodes 4.

It would be useful to know such information, e.g. for network planning purposes, but the intrinsically distributed, non-centralised, multi-provider nature of a large internetwork such as the Internet makes this a very difficult task.

Some Internet service providers (ISPs) install monitoring equipment in cities, but this fails to give information on delivery to actual individuals (e.g. the packet loss or latency as experienced by the end user).

Some ISPs also ask their users to download dedicated applications which they run on their end-user terminals 2 so as to help analyse network performance. However, these are only limited to collecting data on resources within the network of one ISP and do not give a wider picture across the internetwork.

It would be desirable to provide an improved system, method and/or software tool for collecting information on network resources in a packet-based internetwork such as the Internet.

SUMMARY

According to one aspect of the present invention, there is provided method of determining information on network resources in a packet-based internetwork comprising multiple routing nodes, the method comprising: distributing user software to each of multiple end-user terminals connected to the internetwork, the user software having a primary user function other than said collection of network data; in association with the user software, distributing secondary code configured to participate in said collection of data by probing different routes from the respective end-user terminal to a destination terminal over the internetwork, each route passing via a plurality of said routing nodes; receiving data resulting from the probing performed by the secondary code on the multiple end-user terminals, including data resulting from routes involving the routing nodes of different network service providers; and determining estimates of network resources based on the received data.

By distributing such a network resource monitoring tool to users in the form of secondary code distributed in association with another existing item of user software such as Voice-over-IP (VoIP) or web browser software, regardless of a user's ISP, then the present invention can advantageously exploit a large existing user base, thus collecting data from users who access the internetwork via the nodes of various different network service providers. The invention thereby allows a larger picture of network topology to be developed across a wider portion of the internetwork, and not just limited to a single geographical region or the nodes of a single service provider. That is, by probing routes spanning the equipment of different service providers (e.g. ISPs) in different geographical locations, it is possible to determine a better overall model of the topology of the Internet or other such internetwork Preferably the distribution of the user software and associated secondary code comprises: distributing a respective instance of a user application to each of the end-user terminals, the user application comprising the user software and the secondary code, with the user software and secondary code being part of the same user application at least in that execution of the secondary code is dependent on execution of the user software.

The secondary code may be configured to execute automatically with the user software when user application is launched.

The secondary code may be configured to execute when the user selects an option presented by the user software during execution thereof.

The secondary code may be distributed as part of a same download and installation process as the user software.

Hence in the preferred embodiments, the user's terminal will automatically participate in the collection of data without the user being unduly inconvenienced to manually operate or download a separate, stand-alone application in the manner that some ISPs currently ask their customers to do. Instead the secondary, resource monitoring code will simply run in the background whilst the user has open the user application for its other, main purpose for which the user ostensibly uses that application (e.g. VoIP calls or browsing the Web). Reducing the onus on the user in this manner is particularly effective in encouraging take-up of the resource monitoring tool by users and thereby exploiting a large user base across a large portion of the internetwork.

In further embodiments the probing may be performed according to a randomized algorithm.

In a particularly preferred embodiment the user software comprises communication software having a primary user function of conducting a communication in the form of a packet-based voice call, video call, or IM messaging exchange over the packet-based internetwork.

The user application may comprise a communication client application comprising said communication software and secondary code.

The communication software may be configured to conduct said communication between its respective end-user terminal and the destination terminal over the internetwork via a first route, and the secondary code may be configured to transmit a probe packet over one or more different, second routes, each of the first and second routes passing via a plurality of said routing nodes; and said determination may comprise determining information about network resources along at least one of the first and second routes based on a difference in a delivery property experienced via the first and second routes.

The delivery property may comprise at least one of latency, jitter, packet loss, error rate, and bitrate.

The routing from one routing node to the next along each route may be determined by a lower-level internetwork layer protocol; and the secondary code may be configured to cause routing via the one or more second routes by routing the probe packet at a higher-level, application layer, by directing the probing packets to the destination terminal via one or more further instances of the user application on a respective one or more relaying end-user terminals.

The relaying end-user terminal need not be a consumer of the communication.

The secondary code may be configured to redirect the communication via a relaying end-user terminal in dependence on the determination of network resources.

The secondary code may be configured to report the data resulting from said probing to a data processing facility which performs said determination of information on network resources.

The data processing facility may control said redirection.

Thus in one particularly advantageous implementation, the information on network resources can be used not only to model the topology of the internetwork, but also to select a third-party relay for relaying a communication stream at the application layer. Although potentially being an end-user of the communication system in general, the relaying terminal need not be a consumer of the particular stream being relayed. In embodiments, this can be particularly useful for example in finding a most efficient route for NAT or firewall traversal (efficient in terms of a delivery property such as reducing latency and/or packet-loss); or simply for finding a most efficient route for the stream (the route determined only by the internetwork layer routing, e.g. IP layer routing, is not necessarily the most efficient as it is only concerned with the next immediate hop over the next direct connection from one routing node 4 to the next, and does not anticipate bottlenecks or other problems that may occur further along the route).

In an alternative embodiment the user software comprises web browser software.

According to another aspect of the present invention, there is provided a user application for use on a end-user terminal connected to a packet-based internetwork comprising a plurality of routing nodes, the user application being embodied on a non-transient, computer-readable medium and comprising: user software having a primary user function other than said collection of network data; secondary code configured to participate in collecting data on network resources in said packet-based internetwork, by probing a plurality of different routes from the respective end-user terminal to a destination terminal over the internetwork, each route passing via a plurality of said routing nodes; wherein the secondary code is further configured to report data resulting from the probing, including data resulting from routes involving the routing nodes of different network service providers, thereby enabling estimates of network resources to be determined based on the reported data.

In embodiments the user application may be further configured in accordance with any of the above method features.

According to another aspect of the present invention, there is provided a system for determining information on network resources in a packet-based internetwork comprising multiple routing nodes, comprising a network apparatus for distributing user software to each of multiple end-user terminals connected to the internetwork, the user software having a primary user function other than said collection of network data; wherein the network apparatus is further configured to distribute, in association with the user software, secondary code configured to participate in said collection of data by probing different routes from the respective end-user terminal to a destination terminal over the internetwork, each route passing via a plurality of said routing nodes; and the system comprises a data processing facility configured to receive data resulting from the probing performed by the secondary code on the multiple end-user terminals, including data resulting from routes involving the routing nodes of different network service providers, and to determine estimates of network resources based on the received data.

BRIEF DESCRIPTION OF THE DRAWINGS

For a better understanding of the present invention and to show how it may be put into effect, reference will be made by way of example to the accompanying drawings in which.

DETAILED DESCRIPTION OF PREFERRED EMBODIMENTS

Figure 2:
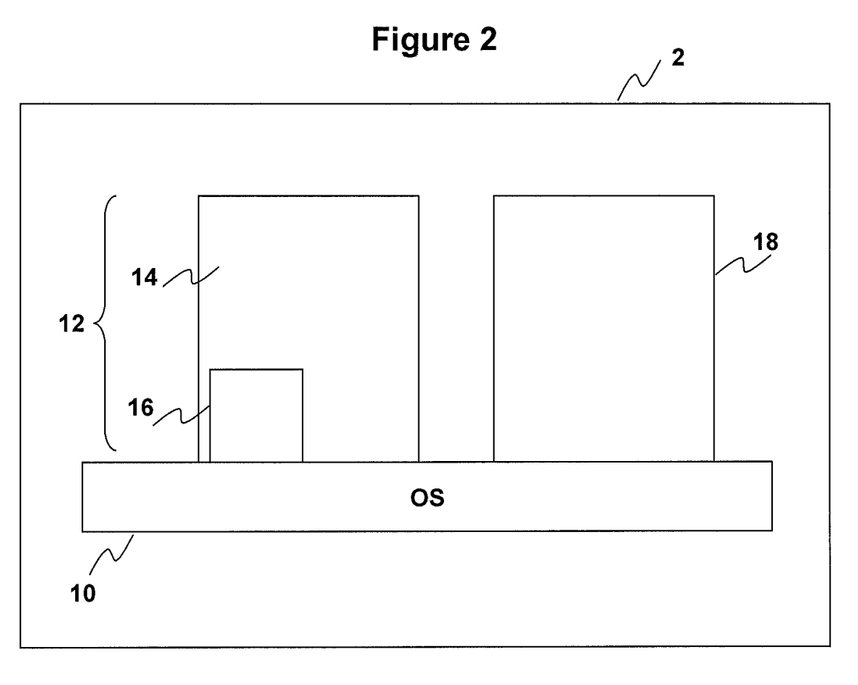
FIG. 2 is a schematic block diagram of a user application.

FIG. 2 provides a schematic block diagram of an end-user computer terminal 2 which comprises a processing apparatus in the form of one or more processing units and an electronic storage medium in the form of a non-volatile memory such as a ROM, hard-drive and/or flash memory. The end-user terminal could be any of a desktop computer, a laptop computer, tablet style computer or mobile handset such as a "smart phone", or a household appliance with an embedded processing apparatus such as a TV or set-top box. Each end-user terminal 2a, 2b, 2c . . . 2ψ shown in FIG. 1 could be any such terminal of this kind or other.

The storage medium of each end-user terminal 2 stores an operating system (OS) 10, which is arranged for execution on the respective processing apparatus. The storage medium also stores a number of user applications, e.g. a communication client application 12 in the form of a voice-over-IP (VoIP) and/or instant messaging (IM) client, and one or more other applications 18 such as a web browser, email client, music player, etc. The user applications 12, 18 are also arranged to be executed on the processing apparatus under control of the operating system 10.

According to embodiments of the present invention, the communication client application 12 comprises a main portion of communication software 14 and also a secondary portion of code 16. The main portion, the communication software 14, is configured so as when executed to perform the main user function of the communication client, e.g. VoIP calls, video calls and/or IM messaging, i.e. the main function or purpose for which the user is running the application 12. However, the secondary code portion 16 provides an additional, secondary function of participating in the monitoring of network resources by probing various routes over the internetwork and reporting results of that probing such as the latency, packet loss rate or bitrate experienced over the probed routes.

Figure 3:
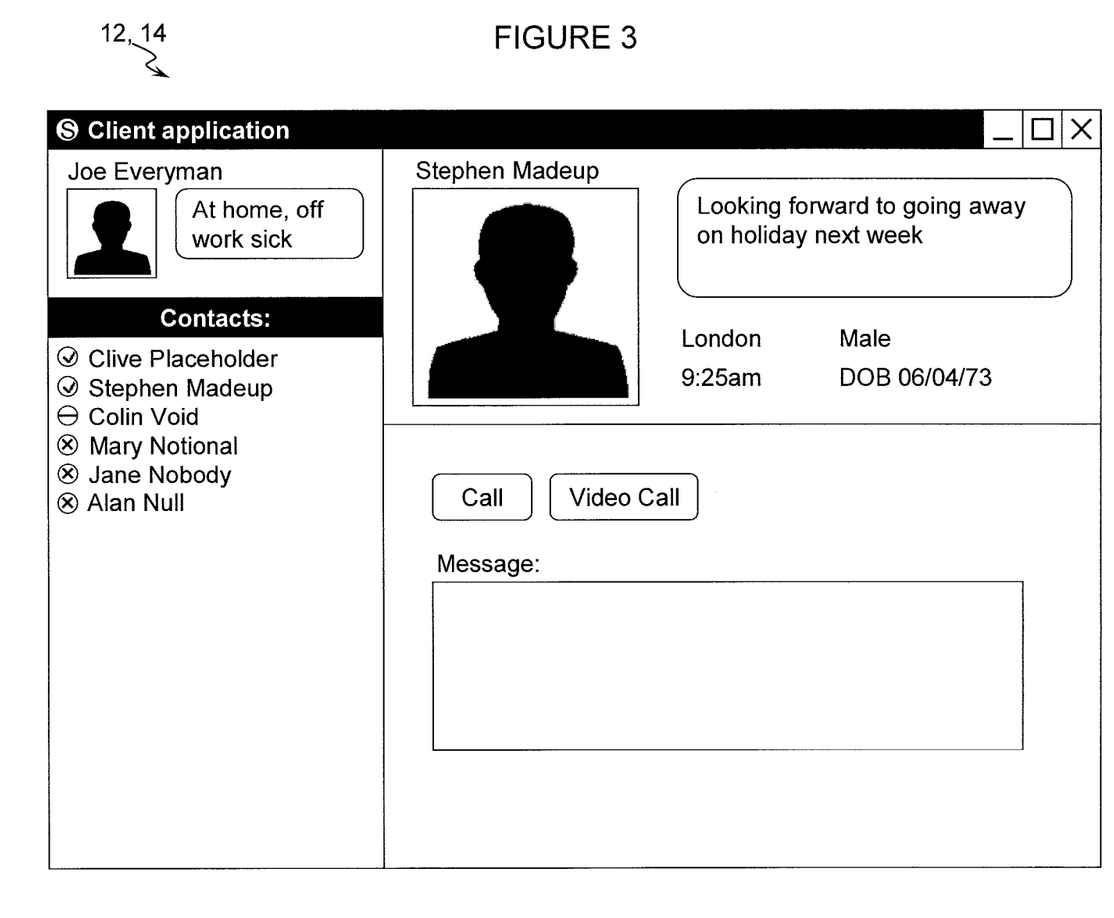
FIG. 3 is a schematic illustration of a user interface of a user application.

From the user's day-to-day perspective, he or she is ostensibly running a regular communication client and need see only a conventional front-end user interface of such a client as illustrated schematically in FIG. 3, this being what is presented by the communication software 14. However, when the user application 12 is running, then as well as the main communication software 14, the secondary, resource monitoring code 16 will also be running in the background (in an invisible or minimally visible fashion). The user may be made aware of the secondary code when installing or updating the communication client application, e.g. as part of a license agreement. In embodiments, the user interface of communication client 12 may also provide the user with an option of enabling and disabling the resource monitoring by the secondary code, e.g. by means of an options menu that may be summoned via some suitable control in the client front-end user interface.

Where it is referred to an application, this is not necessarily intended to refer to a fundamentally inseparable unit of software, but could alternatively refer to any executable program such as composite application formed by a plug-in, update or add-on to an existing application (e.g. the secondary code 16 could be provided as a plug-in which interfaces with the communication software 14 so as to operate as a part of the same overall application 12). Nonetheless, in the preferred embodiments it is intended that the secondary code 16 is at least associated with the main user function of the user application 12 in that it is run in dependence on the execution of the communication software. That is, the user application 12 will comprise primary code 14 for performing the main user function for which the user application is provided (e.g. communication client), this being the main software which launches when the application 12 is launched. The user application 12 will then further comprise secondary code 16 for probing and reporting network data, and execution of the secondary code 16 is made dependent on the primary code 14 being executed. For example, the secondary code 16 could be considered to be part of the same user application 12 in that it is configured to run automatically with the main communication software 14 upon launch of the user application 12, or in that it is run from within the user application 12 only once a user selects an option during execution of the main software 14.

The secondary code 16 is preferably distributed at the same time as the primary software 14 which performs the main function of the user application, being downloaded and installed by the user at same time, i.e. on the same occasion as part of the same download and install operation so that the user does not have to manually instigate a separate download or installation. Alternatively the secondary code 16 could be downloaded separately as an add-on, though preferably as part of an update process including an update to the primary software 14.

From the user's perspective, the main communication software 14 and the user application 12 are one and the same, and most of the time the user need not be consciously aware of the secondary code 16 running in the background (except for example when accepting the initial license agreement or toggling the option to enable or disable the secondary code 16). Nonetheless, the network monitoring by the secondary code 16 may be ultimately beneficial to the user in that it can lead to improved network topology or routing.

Figure 4:
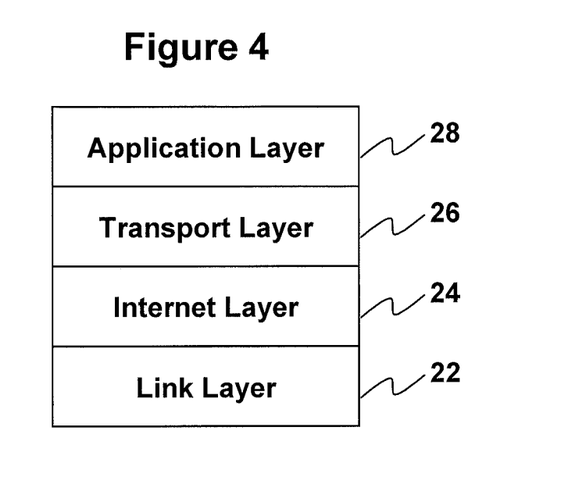
FIG. 4 is a schematic representation of a protocol stack.
Figure 5:
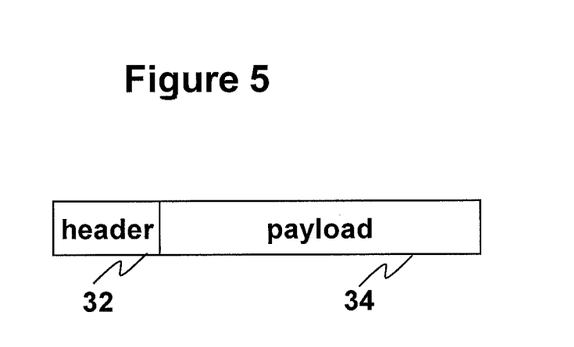
FIG. 5 is a schematic representation of a packet of data.

The mechanism by which the secondary code 16 is preferably configured to monitor network resources (or at least participate in the monitoring of network resources) is now discussed in more detail with reference to FIGS. 1, 4 and 5. The following will be described by way of example in relation to a VoIP client for conducting live voice and/or video calls over the Internet, but it will be understood that the scope of the invention can extend to other kinds of communication client for communicating over any packet-based internetwork type arrangement.

As will be familiar to a person skilled in the art, the basic mechanism by which terminals and nodes communicate over an internetwork such as the Internet can be considered as a protocol stack (embodied in the software running on each terminal 2, 3 and routing node 4). There are a number of ways of representing a protocol stack, but one common way is shown in FIG. 4.

In this representation, the lowest layer is the link layer 22 which is responsible for conveying bits over the immediate, direct link between a user terminal 2 and a routing node 4 or between two routing nodes 4. This could involve for example the protocol for conveying data over a dial-up, broadband, ethernet or wi-fi connection. The link layer 22 does not include the concept of routing at the internetwork level, and different direct link layer protocols can be used over different links, because it is the next layer up, the internetworking layer 24 (e.g. IP layer), which provides a common protocol for routing across the internetwork. That is, the link layer 22 does not determine which next routing node 4 or terminal 2 a packet should be directed to, but only transmits the bits of the packet to the next routing node 4 or terminal 2 once that node or terminal has been identified based on the internetwork address (e.g. IP address) at the internetwork layer (e.g. IP layer) 24.

The internetwork layer (e.g. IP layer) 24 is the packet protocol responsible for immediate packet routing. As shown schematically in FIG. 5, a packet of data comprises both a header portion 32 and a payload 34. The header 32 comprises the internetwork address (e.g. IP address) of the destination end-user terminal 2, and the payload comprises the actual user data desired by the transmitting user application 12, 18 to be transmitted. When a routing node 4 receives a packet, its IP layer software examines the IP address and determine the next adjacent routing node 4 to which to route the packet (or end-user terminal 2 if the destination terminal is adjacent), i.e. determines the next direct link or next internetwork hop over which to transmit the packet. However, the IP layer 24 at any one given node 4 cannot determine or specify an overall topology for the route, i.e. cannot determine multiple hops at once, but only the next immediate hop to the next adjacent node 4 or terminal 2.

The transport layer 26 adds additional header information wrapped on top of the IP header. The transport protocol may thus add a certain degree of end-to-end connectivity such as port numbering, error detection, packet ordering, and acknowledgement of packet receipt. However, the transport layer 26 still does not provide the facility for a user application to specify a route topology, i.e. does not allow a user application to select which routing nodes 4 the packet will be route through.

Finally, the application layer 28 relates to the user information to be included in the packet payload 34, e.g. audio or video content of a voice or video call, or user text for an IM message. An application 12, 18 is free to include any content it wishes in the payload as appropriate to the application in question.

According to a preferred implementation, the present invention additionally makes use of the application layer and packet payload to provide an additional layer of routing, providing an additional degree of control over the routing topology which is not supported by the IP or transport layers 24, 26. This kind of routing at the application layer can referred to as forming an "overlay network".

For example, suppose an instance of a communication application 12 running on a transmitting end-user terminal 2e wishes to send a packet or stream of packets to another instance of the communication client 12 running on a destination end-user terminal 2x. The route that would naturally be determined by IP layer routing alone may for example travel via transatlantic link 4h to 4o. However, suppose the transmitting application 12 instead wishes to transmit the packets via an instance of the communication application running on a third, relaying end-user terminal 2λ. In this case it generates the packets having an IP address of the relaying end-user terminal 2λ, thus specifying the relaying end-user terminal 2λ as the destination terminal as far as the IP layer 24 is concerned. However, in at least one of the packet payloads 34, the transmitting terminal 2e also inserts an indication identifying the ultimate destination 2x. When the instance of the communication application 12 on the relaying terminal 2λ receives the packets, it unwraps the payloads, determines the IP address of the ultimate destination terminal 2x (e.g. based on a look-up table mapping the indicated identity to an IP address), then rewraps the rest of the payload media with an IP header comprising the IP address of the destination terminal 2x and retransmits the packets over the Internet. This would then result in an overall route via transatlantic link 4h-4w then international link 4w-4o (amongst other hops), rather than via 4h-4o directly.

A server 3 could also be specified as an application-layer relaying terminal in this manner.

In a conventional overlay network this kind of technique may only be used with the intention of making use of some advantageous property of the relaying end-user terminal 2,3, e.g. because it allows traversal of a firewall or NAT, or because it has better processing resources for facilitating multiparty conference call (three or more participants). However, according to embodiments of the present invention, the application layer routing technique is used to force a route via certain routing nodes 4 or certain link between routing nodes 4 so as to probe some delivery property of that route such as the latency, packet loss bitrate, throughput and/or jitter.

Thus whilst a user application 12, 18 doesn't have direct control over what nodes the packets are routed through, it can nonetheless steer some aspects of the route by routing via an intermediary user application 12 forming part of the same overlay network.

Some example applications of this technique to the monitoring of network resources will now be discussed in more detail.

Referring again to FIG. 1, suppose to begin with the VoIP client 12 running on end-user terminal 2e sets up a voice or video stream with a destination end-user terminal 2x without specifying any particular routing at the application layer. In this case the route does not involve any relaying end-user terminals 2 or servers 3 and is determined only by the IP address of the destination terminal 2x in the header of the transmitted packets and the routing decisions made by the routing nodes 4 of the network service providers. For example the initial route could be:

2*e*-4*b*-4*f*-4*h*-4*o*-4*n*-4*k*-2*x*

However, the VoIP client 12 may wish to determine whether another route may in fact be better in terms of one or more measurable delivery properties, e.g. to reduce latency, packet loss or error rate, increase bitrate, and/or jitter. Particularly, when routing over a large internetwork such as the Internet then the geographically shortest route or the route determined by the IP layer alone is not necessarily the best. For example, a geographically nearby routing node 4 could be experiencing a bottleneck. Therefore it would be desirable to be able to test other possible routes which could be forced at the application layer by routing via another, relaying end-user terminal 2 or server 3 (or indeed via a plurality of these).

To this end, the VoIP client 12 is configured by means of its special secondary code 16 to transmit one or more probe packets along an alternative route involving at least one relaying end-user node and/or server 3, by means of application layer routing. For example the one or more probe packets could be transmitted along the route:

2*e*-4*b*-4*c*-2*i*-4*c*-4*g*-4*h*-4*o*-4*n*-4*k*-2*x*

Preferably the VoIP client 12 will in fact probe multiple routes in a similar manner, e.g. some others could be:

2*e*-4*b*-4*a*-3*a*-4*a*-4*h*-4*o*-4*n*-4*k*-2*x*
2*e*-4*b*-4*f*-4*h*-4*w*-4*t*-4*q*-2λ-4*q*-4*t*-4*w*-4*o*-4*n*-4*k*-2*x*
2*e*-4*b*-4*f*-4*h*-4*w*-4*u*-3*d*-4*u*-4*w*-4*o*-4*n*-4*k*-2*x*
2*e*-4*b*-4*f*-4*h*-4*o*-4*m*-4*i*-2*t*-4*i*-4*j*-4*k*-2*x*

Etc.

The one or more probe packet may act as a "ping" to the destination terminal 2*x*, so as to invoke a response back from the client 12 running on the destination terminal 2*x* to the client 12 running on the transmitting terminal 2*e* reporting on the delivery property experienced by the one or more probe packets over the probed route. Alternatively the one or more probe packets could trigger the destination terminal 2*x* to report the experienced delivery to a controller running on a control server, e.g. 3*b*, which in turn is configured to be able to control the behaviour of the transmitting end-user terminal 2*e* (control being signalled either via the Internet or an alternative control medium such as a cellular network).

The initial route is also probed for the same information, either implicitly by the transmitted stream or by a separate one or more probe packets.

If any of the probed routes is found to be better than the initial or current route in terms of some quantifiable delivery property such as packet-loss, error rate, latency or bitrate, etc. (or some metric based on one or more of these or combining two or more of these) then either the client 12 on the transmitting terminal 2*e* or the controller running on the control server 3*b* will direct the main voice or video stream via the improved route, by means of application later routing via a relaying end-user node 2 or server 3. This process may be repeated throughout ongoing transmission of the stream so as to dynamically update or check for the best route.

A similar technique can be used to find routes for other types of stream or communication, e.g. file transfers or IM messaging exchanges. In embodiments the delivery property or properties in question may depend on the type of communication required by the client 12.

In the case where the relaying terminal is an end-user terminal, e.g. 2*i* or 2*t*, note that the relaying end-user terminal need not be a consumer of the stream (consume in this sense means to use the stream for its ultimate purpose, e.g. playing out a voice or video stream, displaying an IM message, or storing a file received by file transfer). Rather, the relaying end-user terminal may simply be installed with yet another instance of the communication client application 12 by a user who has agreed to join this mutual routing scheme (the user of the relay terminal 2*i* or 2*t* may benefit from the overall agreement him or herself when becoming the transmitter or consumer of a totally different stream involving on another occasion).

In a preferred embodiment, the probing is determined in a manner analogous to an ant colony. To obtain food, the majority of ants in a colony will follow a trail of scent left by another ant between the food and the ants' nest. However, occasionally one random ant will leave the main stream and go off on a random walk. If that random walk happens to result in a better route to food, that ant will return back to the nest leaving a new trail of scent. The bulk of the ants will then follow the new trail. In an analogous fashion, the present invention may employ a random "ant colony" style algorithm whereby the main traffic stream is routed via a current route, but at times a probe packet is transmitted randomly over a different, test route. Either the timing and/or the path of the probing may be random.

However, in alternative embodiments the probed routes could be determined in a systematic fashion, e.g. cycling periodically through a list of potential relays 2, 3; or could involve a combination of random and systematic factors.

The algorithm which determines the probing frequency and application layer routing, whether random or systematic, could be part of the transmitting VoIP client 12 itself, or could be run at a control module running on a control server, e.g. 3*b*, which is configured to be able to control when and where the transmitting VoIP client 12 will probe (control being signalled either via the Internet or an alternative control medium such as a cellular network).

Another, related use of the present invention is for firewall or NAT (network address translation) traversal. E.g. in the above example the basic route 2*e*-4*b*-4*f*-4*h*-4*o*-4*n*-4*k*-2*x* may not be an option because 2*x*'s firewall may not trust the sender 2*e*, or 2*e* may not be able to penetrate 2*x*'s NAT. That is, even the initial stream may involve a relay 2, 3 at the application layer. In this case the process for dynamically checking or updating which is the best route can proceed exactly as discussed above, but with the additional criterion that any chosen route must also traverse the firewall or NAT in question (and with the aim of finding the best way to traverse the firewall or NAT). Note that the relay geographically closest to the destination is not necessarily the best.

Yet another use of the present invention is to report data to a data processing facility so as to build up an overall model of network topology (which will likely vary with time). The data processing facility could be a server, e.g. 3*b*, or could even be a distributed algorithm distributed amongst a plurality of end-user terminals 2.

In operation, a plurality of instances of communication client application 12 running on various different end-user terminals 2 will each be running the resource monitoring code 16 to probe various routes across the Internet by means of application layer routing as discussed above. Regardless of whether the individual communication clients 12 use this to redirect their own media streams, they may still be arranged to report the results of the probing to the data facility 3*b*. That is, either the destination terminal (e.g. 2*x*) or the transmitting terminal (e.g. 2*e*) will report the measured delivery property such as the packet loss, error rate, latency, bitrate or jitter experienced over the probed route (or some metric based on these) to the data processing facility. Preferably the reporting to the data processing facility 3*b* is also performed via the Internet (though the possibility of an alternative reporting medium such as a cellular connection is not excluded).

Any one single act of probing will not be enough to determine where bottlenecks or other problems are occurring. However, once two or more routes have been probed then information can be inferred about the location of bottlenecks or other problems within the Internet/internetwork.

Consider again the examples of probed routes given above.
(i) 2e-4b-4f-4h-4o-4n-4k-2x
(ii) 2e-4b-4c-2i-4c-4g-4h-4o-4n-4k-2x
(iii) 2e-4b-4a-3a-4a-4h-4o-4n-4k-2x
(iv) 2e-4b-4f-4h-4w-4t-4q-2λ-4q-4t-4w-4o-4n-4k-2x
(v) 2e-4b-4f-4h-4w-4u-3d-4u-4w-4o-4n-4k-2x
(vi) 2e-4b-4f-4h-4o-4m-4i-2t-4i-4j-4k-2x If, say for example, route (ii) experiences a significantly lower latency or packet loss than route (ii), this could imply that the routing node 4f (eliminated in the second route (ii) is problematic, e.g. currently overloaded with much traffic If on the other hand all of routes (i)-(iii) and (vi) experience a relatively high delay or packet loss compared to routes (iv) and (v) which take an alternative transatlantic route, this may imply that the transatlantic route between 4h and 4o is the source of the problem. This is an example where a shorter geographical distance is not necessarily a guarantee of a better route.

As another example, suppose all of routes (i) to (v) are bad and there is little difference between the different transatlantic routes, but that route (vi) shows a significant improvement (reduction) in delay or packet loss. This may imply that node 4n is the problematic stage in the chain.

In another example, if all routes involving end-user terminals 2o, 2p and 2q are bad whilst most other routes are good, then it may be possible to infer that there is a problem within the LAN 5.

Thus effectively, the data reported for the multiple routes by the multiple end-user terminals 2 can be considered to form a large simultaneous equation to be solved or estimated by the data processing facility. Even if it is not possible to "solve" the equation strictly, it may still be possible to build up a picture or model of likely network topology. The more combinations of routes involving the more end-user terminals are tested, the more links or nodes can be factored in as a source of potential problem. Hence the distribution of the resource monitoring code 16 with a popular user application such as a VoIP communication client is particularly advantageous.

Ultimately, the gathered information can be used to modify the internetwork, e.g. install new equipment, upgrade existing equipment, or modify the routing policy at one or more nodes.

It will be appreciated that the above embodiments have been described only by way of example.

For instance, the invention is not limited to use in a VoIP client, but could be used to control routing in other kinds of communication client such as to select routes for IM messaging exchanges. Further, the invention Is not limited to distribution in a communication client, but could alternatively be distributed with another kind of widespread user application such as a web browser or music player, etc.

The act of probing by the secondary code 16 may comprise transmitting separate, artificial probing packets or messages, i.e. not containing any user traffic, nor any data related to the function of the primary code 14 or indeed any other purpose. Alternatively the act of probing by the secondary code 16 could involve using packets that are already being transmitted by the primary code 14 in relation to its "normal" primary function, e.g. when the primary code 14 performs presence pings to obtain presence information from other nodes, or when the primary code 14 collects information on nodes of a distributed database in a peer-to-peer scenario. i.e. in this case, the secondary code would add a secondary purpose to certain packets communicated by the first code 14.

Figure 6:
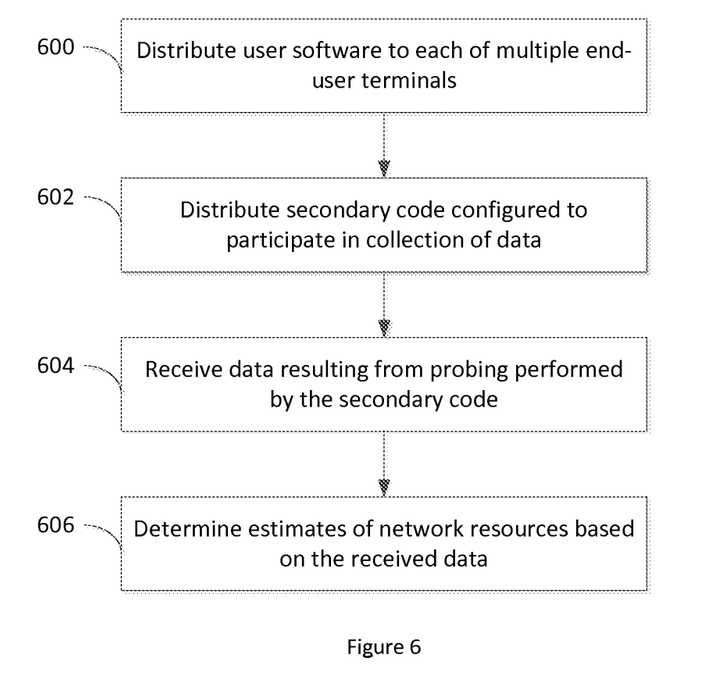
FIG. 6. is a flow diagram that describes steps in a method in accordance with one or more embodiments.

FIG. 6 is a flow diagram that describes steps in a method in accordance with one or more embodiments. In at least some embodiments, the method can be performed in connection with suitably-configured software. Step 600 distributes user software to each of multiple end-user terminals. In the illustrated example, the end-user terminals are connected to an internetwork such as that described above. In one or more embodiments, the user software has a primary user function other than collection of network data. Step 602 distributes secondary code configured to participate in collection of data. This step is performed in association with the user software. This step is performed by probing different routes from the respective end-user terminal to a destination terminal over the internetwork, where each route passes via a plurality of routing nodes. Step 604 receives data resulting from probing performed by the secondary code on the multiple end-user terminals. This includes data resulting from routes involving the routing nodes of different network service providers. Step 606 determines estimates of network resources based on the received data.

Furthermore, whilst above has been largely described in terms of end-user terminals 2, but any of a transmitting terminal, destination terminal or relaying terminal could alternatively be a server terminal 3. Note that the term server is not necessarily intended to limit to single server unit at a single site or in a single housing, but also cover an arrangement of multiple server units in multiple housings or sites. With regard to the routing nodes 4 of the network service providers, note that router or routing does not imply any specific piece of network equipment, but can refer to any node for or act of forwarding data. Further, network service provider is not intended to limit to any particular kind of business model and can generally refer to any network operator or such like.

Other variants may be apparent to a person skilled in the art given the disclosure herein. The scope of the present invention is not limited by the example embodiments described above but only by the appendant claims.

The invention claimed is:

1. A method of determining information on network resources in a packet-based internetwork comprising multiple routing nodes, the method comprising:

distributing user software to each of multiple end-user terminals connected to the internetwork by distributing a respective instance of a user application to each of the end-user terminals, the user application comprising the user software and secondary code, with the user software and secondary code being part of the same application at least in that execution of the secondary code is dependent on execution of the user software, the secondary code being distributed as part of a same download and installation process as the user software, the user software having a primary user function other than collection of network data, the user software comprising web browser software;

in association with the user software, distributing secondary code configured to participate in said collection of data by probing different routes from the respective end-user terminal to a destination terminal over the internetwork, each route passing via a plurality of said routing nodes;

receiving data resulting from the probing performed by the secondary code on the multiple end-user terminals, including data resulting from routes involving the routing nodes of different network service providers, the secondary code configured to report the data resulting from said probing to a data processing facility which determines estimates of network resources based on the received data.

2. The method of claim 1, wherein the secondary code is configured to execute automatically with the user software when user application is launched.

3. The method of claim 1, wherein the secondary code is configured to execute when the user selects an option presented by the user software during execution thereof.

4. The method of claim 1, wherein the user application further comprises communication software having a primary user function of conducting a communication in the form of a packet-based voice call, video call, or IM messaging exchange over the packet-based internetwork.

5. The method of claim 1, wherein:
the user software is configured to conduct a communication between the user software's respective end-user terminal and the destination terminal over the internetwork via a first route, and the secondary code is configured to transmit a probe packet over one or more different, second routes, each of the first and second routes passing via a plurality of said routing nodes; and
said determining estimates of network resources comprises determining information about network resources along at least one of the first and second routes based on a difference in a delivery property experienced via the first and second routes.

6. The method of claim 5, wherein the delivery property comprises at least one of latency, jitter, packet loss, error rate, and bitrate.

7. The method of claim 5, wherein:
the routing from one routing node to the next along each route is determined by a lower-level internetwork layer protocol; and
the secondary code is configured to cause routing via the one or more second routes by routing the probe packet at a higher-level, application layer, by directing the probing packets to the destination terminal via one or more further instances of the user application on a respective one or more relaying end-user terminals.

8. The method of claim 7, wherein the relaying end-user terminal is not a consumer of the communication.

9. The method of claim 7, wherein the secondary code is configured to redirect the communication via a relaying end-user terminal in dependence on the determining estimates of network resources.

10. The method of claim 1, wherein the probing is performed according to a randomized algorithm.

11. A system for determining information on network resources in a packet-based internetwork comprising multiple routing nodes, comprising:
a network apparatus for distributing user software to each of two or more end-user terminals connected to the internetwork, the user software comprising web browser software, the network apparatus configured to distribute, in association with the user software, secondary code configured to participate in collection of data by probing different routes along a plurality of the routing nodes from the respective end-user terminal to a destination terminal over the internetwork; and
a data processing facility different from the network apparatus, the data processing facility configured to receive data resulting from the probing performed by the secondary code on the multiple end-user terminals, including data resulting from routes involving the routing nodes of different network service providers, and to determine estimates of network resources based on the received data.

12. The system of claim 11, wherein the configuration to distribute user software and associated secondary code comprises: distributing a respective instance of a user application to each of the end-user terminals, the user application comprising the user software and the secondary code, with the user software and secondary code being part of the same user application at least in that execution of the secondary code is dependent on execution of the user software.

13. The system of claim 12, wherein the secondary code is distributed as part of a same download and installation process as the user software.

14. The system of claim 11, wherein the probing different routes comprises transmitting one or more probe packets along a route different than a route determined by an internetwork layer of a packet protocol of the one or more probe packets.

15. A method of determining information on network resources in a packet-based internetwork comprising multiple routing nodes, the method comprising:
distributing user software to each of multiple end-user terminals connected to the internetwork by distributing a respective instance of a user application to each of the end-user terminals, the user application comprising the user software and secondary code, with the user software and secondary code being part of the same application at least in that execution of the secondary code is dependent on execution of the user software, the secondary code being distributed as part of a same download and installation process as the user software, the user software having a primary user function other than collection of network data;
in association with the user software, distributing secondary code configured to participate in said collection of data by probing different routes from the respective end-user terminal to a destination terminal over the internetwork, each route passing via a plurality of said routing nodes;
receiving data resulting from the probing performed by the secondary code on the multiple end-user terminals, including data resulting from routes involving the routing nodes of different network service providers, the secondary code configured to report the data resulting from said probing to a data processing facility which determines estimates of network resources based on the received data, the data processing facility configured to redirect the communication via a relaying end-user terminal in dependence on the determining estimates of network resources.

16. The method of claim 15, wherein the secondary code is configured to execute automatically with the user software when user application is launched.

17. The method of claim 15, wherein the secondary code is configured to execute when the user selects an option presented by the user software during execution thereof.

18. The method of claim 15, wherein the user software comprises web browser software.

19. The method of claim 15, wherein the probing is performed according to a randomized algorithm.

20. The method of claim 15, wherein the probing different routes comprises transmitting one or more probe packets along a route different than a route determined by an internetwork layer of a packet protocol of the one or more probe packets.

* * * * *